(12) United States Patent
Den Haak et al.

(10) Patent No.: US 9,797,452 B2
(45) Date of Patent: Oct. 24, 2017

(54) CAPPED BEARING WITH VIBRATION SENSOR

(71) Applicants: Nicolaas Simon Willem Den Haak, Zwijndrecht (NL); Koos Welling, Utrecht (NL); Jascha van Pommeren, Zwijndrecht (NL)

(72) Inventors: Nicolaas Simon Willem Den Haak, Zwijndrecht (NL); Koos Welling, Utrecht (NL); Jascha van Pommeren, Zwijndrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/091,179

(22) Filed: Apr. 5, 2016

(65) Prior Publication Data

US 2016/0298690 A1   Oct. 13, 2016

(30) Foreign Application Priority Data

Apr. 10, 2015   (GB) .................................. 1506138.5

(51) Int. Cl.
| | | |
|---|---|---|
| F16C 41/00 | (2006.01) |
| F16C 19/52 | (2006.01) |
| F16C 35/04 | (2006.01) |
| F16C 43/04 | (2006.01) |
| F16C 33/78 | (2006.01) |
| F16C 19/26 | (2006.01) |

(52) U.S. Cl.
CPC ........ *F16C 33/7886* (2013.01); *F16C 19/527* (2013.01); *F16C 41/008* (2013.01); *F16C 19/26* (2013.01); *F16C 2220/42* (2013.01); *F16C 2226/34* (2013.01); *F16C 2233/00* (2013.01)

(58) Field of Classification Search
CPC ........ F16C 19/26; F16C 19/527; F16C 33/78; F16C 35/04; F16C 41/007; F16C 19/522; F16C 33/586; F16C 33/7886; F16C 2220/42; F16C 2226/34; F16C 2233/00; F16C 41/008; G01P 3/443
USPC ....... 384/446, 448, 534–544, 589, 490, 510, 384/548; 324/174
See application file for complete search history.

(56) References Cited

U.S. PATENT DOCUMENTS

| | | | | |
|---|---|---|---|---|
| 5,898,388 A | * | 4/1999 | Hofmann ............ F16C 33/7879 310/168 |
| 6,280,096 B1 | * | 8/2001 | Miyazaki ................ B60B 27/00 301/108.1 |
| 6,324,899 B1 | * | 12/2001 | Discenzo ................ F16C 19/52 340/631 |

(Continued)

FOREIGN PATENT DOCUMENTS

| | | | |
|---|---|---|---|
| DE | 102007014016 A1 * | 9/2008 | ............. F16C 33/78 |
| EP | 0511105 A1 | 10/1992 |

(Continued)

*Primary Examiner* — Marcus Charles
(74) *Attorney, Agent, or Firm* — Bryan Peckjian; SKF USA Inc. Patent Dept.

(57) ABSTRACT

A bearing includes a first ring, a second ring, at least one row of rolling elements arranged in a rolling chamber disposed between the first ring and the second ring, and a cap attached to the first ring that is configured to close the rolling chamber. At least one vibration sensor is attached on the inside of the cap, and the vibration sensor is mounted in a metal block connected to the cap.

20 Claims, 3 Drawing Sheets

(56) References Cited

U.S. PATENT DOCUMENTS

| | | | | |
|---|---|---|---|---|
| 6,948,856 B2* | 9/2005 | Takizawa | ............. | F16C 19/525 |
| | | | | 384/448 |
| 7,341,321 B2* | 3/2008 | Takahashi | ............... | B60T 8/171 |
| | | | | 303/168 |
| 7,931,406 B2* | 4/2011 | Matsui | ................. | F16C 33/723 |
| | | | | 324/173 |
| 2003/0048962 A1* | 3/2003 | Sato | .................... | D21G 1/0226 |
| | | | | 384/448 |
| 2003/0091253 A1* | 5/2003 | Morita | ................... | B61F 15/20 |
| | | | | 384/448 |
| 2007/0177834 A1* | 8/2007 | Koyagi | ................ | F16C 19/186 |
| | | | | 384/448 |
| 2008/0199118 A1* | 8/2008 | Yabe | ................... | F16C 33/7879 |
| | | | | 384/448 |
| 2010/0027927 A1* | 2/2010 | Koyagi | ................ | F16C 19/186 |
| | | | | 384/448 |
| 2010/0054643 A1* | 3/2010 | Serafini | ................ | F16C 33/723 |
| | | | | 384/446 |
| 2010/0128848 A1* | 5/2010 | Qiu | ...................... | H01J 35/101 |
| | | | | 378/133 |
| 2012/0230621 A1 | 9/2012 | Inoue et al. | | |

FOREIGN PATENT DOCUMENTS

| | | | | |
|---|---|---|---|---|
| JP | EP-1069435 A2 * | 1/2001 | ......... | B60B 27/0005 |
| JP | 2003056557 A * | 2/2003 | ............... | F16C 19/52 |
| JP | 2003083352 A * | 3/2003 | ............ | D21G 1/0226 |
| JP | 2003113850 A * | 4/2003 | ......... | F16C 33/7856 |
| JP | 2005233290 A * | 9/2005 | ............. | F16C 19/52 |
| WO | 2014/154259 A1 | 10/2014 | | |

* cited by examiner

CAPPED BEARING WITH VIBRATION SENSOR

CROSS-REFERENCE TO RELATED APPLICATIONS

This application claims priority to Swedish patent application no. 1506138.5 filed on Apr. 10, 2015, the contents of which are fully incorporated herein by reference.

TECHNOLOGICAL FIELD

The invention relates to a bearing including a cap. More particularly, this invention relates to a bearing including a cap that provides a sensor attached to the cap.

BACKGROUND OF THE INVENTION

This invention considers a vibration sensor module that can be integrated in a bearing sensor body. It is known to provide bearings with vibrations sensors in order to detect defects in rollers, cage or raceways or operating parameters of a machine using the bearing.

Modern bearing monitoring technology covers multiple sensing features assembled in a sensor cap which is mounted to the axial face of the outer ring. As a rule, the vibration sensors are directly attached to one of the bearing rings or to a massive metal housing accommodating one of the bearing rings in order to ensure a good signal transmission.

However, standard bearings are designed to be used in a wide range of applications and need to strictly respect relevant ISO dimensions. Sensor packages attached to the outside of the bearing rings, e.g. to a side face thereof, have proven useful in some specific fields of application but do not lend themselves to standardized use because the ISO dimensions are exceeded by a bearing equipped with such a sensor package.

The invention seeks in particular to develop a sensor package including sensors, online processing unit, and a wireless transmission unit within the critical ISO dimensions of the bearing, i.e. dimensions according to the ISO 15 general plan pertaining to the bearing type.

SUMMARY OF THE INVENTION

The invention relates to a bearing having a first ring, a second ring, at least one row of rolling elements arranged in a rolling chamber between the first ring and the second ring and a cap attached to the first ring so as to close the rolling chamber. In many cases, the cap is attached to the outer ring. The invention is, however, equally applicable to capped bearings where the cap is attached to the inner ring.

It is proposed that at least one vibration sensor is attached on the inside of the cap. Attaching the sensor to the cap rather than directly to one of the bearing rings inevitably introduces attenuation and reduces the signal-to-noise-ratio such that this is a highly non-obvious choice for the sensor location. However, the inventors have surprisingly found that the signal quality is sufficient for many applications including bearing damage detection. The sensor can be mounted to the cap directly or via a bracket or holder.

The person skilled in the art will understand that the cap does not close the gap between the rings completely but that a small gap may be left to ensure proper functioning of the bearing without friction. The gap may be closed by a sliding seal or the like.

In a preferred embodiment of the invention, the cap is attached to the first ring by a material bonded connection, preferably by brazing. This rigid connection leads to a good transmission of vibrations and stiffens the cap. In embodiments where the sensor cap itself is brazed to the bearing side face any clearances may be avoided and the stiffest connection possible can be made.

In a further embodiment of the invention, the cap includes at least one axial end face, wherein the vibration sensor is attached to the axial end face. The axial end face is usually the largest end face of the cap and has some room for mounting the sensor. In this context, the expressions "axial" and "radial" relate to the rotation axis and symmetry axis of the bearing rings.

It is further proposed that the cap includes at least one radial end face and one axial end face, wherein the vibration sensor is attached to the radial end face. Preferably, the radial end face is in direct contact to the bearing ring such that this location implies that the sensor is very close to the bearing ring. As a result, the attenuation of the vibrations on the path between the bearing ring and the sensor is low. Further, this part of the cap is stiff and stabilized by the bearing ring such that the influence of eigenmode vibrations of the cap is reduced in comparison to other locations. By measuring closer to potential damages of the bearing, the damages can be detected in an earlier phase.

The influence of cap eigenmode vibrations can be further reduced by adding means for damping vibrations of the cap. In a preferred embodiment of the invention, the vibration sensor is arranged in an encapsulation within the cap. The encapsulation serves as a means for damping vibrations and for protecting the vibration sensor. Preferably, the encapsulation is formed by direct injection molding in the cap.

According to a further aspect of the invention, the vibration sensor is mounted in a metal block connected to the cap. The metal block is preferably an aluminum block. The metal block or bracket may provide a chamber to accommodate an air filled area that is needed for the sensor to function. Accelerometers can often not cope with contact other than their intended mounting surface. In addition, the sensor is protected from outside effects such as lubricant, humidity and particles.

In a cost-saving embodiment of the invention, the cap is a stamped sheet metal part.

The invention combines multiple advantages in a favorable way. Firstly, potential damages can be measured in a very early phase. Potentially also other effects such as machine faults like unbalance and misalignment can be seen.

Secondly, the sensor solution remains as compact as state of art electronics allow. Thirdly, the solution of the invention enables a solution fully integrated in the bearing, which may further be retrofittable because critical ISO dimensions are obeyed. Fourthly, the solution could become very cost-efficient, as the accelerometer (e.g. piezo-based) is available at low cost in high quantities. Finally, it is possible to provide an air-filled chamber accommodating the vibration sensor.

The invention describes a compact, integrated solution to measure vibrations with good sensitivity and signal to noise ratio.

The selected solution preferably includes a sensor package configured protrude from the cap in axial direction at sealing area and hold the electronics in a steel sensor body. The drawback of this solution as compared to attaching the sensor package to the bearing ring or to a bearing housing is the limited stiffness of the cap in comparison to the bearing or housing. This results in relatively low eigenfrequencies and numerous mode shapes in the frequency range of interest. Thanks to the mounting close to the outer ring (allowing only small displacements) and the added damping the accompanying resonances are still manageable.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE EMBODIMENTS

Figure 1:
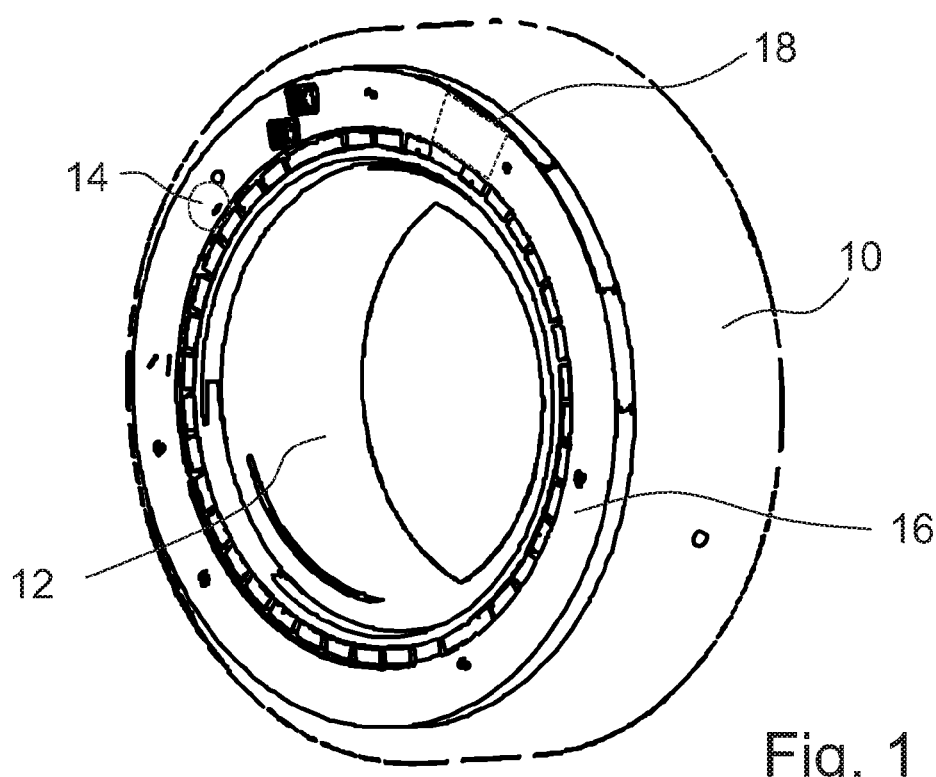
FIG. 1 is a schematic view of a bearing according to the invention.

FIG. 1 is a schematic perspective view of a bearing according to the invention. The outer dimensions are those of any ISO standard bearing. The bearing is a capped bearing and includes an outer ring as a first ring 10, an inner ring as a second ring 12, at least one row of rolling elements 14 arranged in a rolling chamber between the first ring 10 and the second ring 12 and a cap 16 formed as a stamped sheet metal piece attached to the first ring 16 so as to close the rolling chamber.

Figure 2:
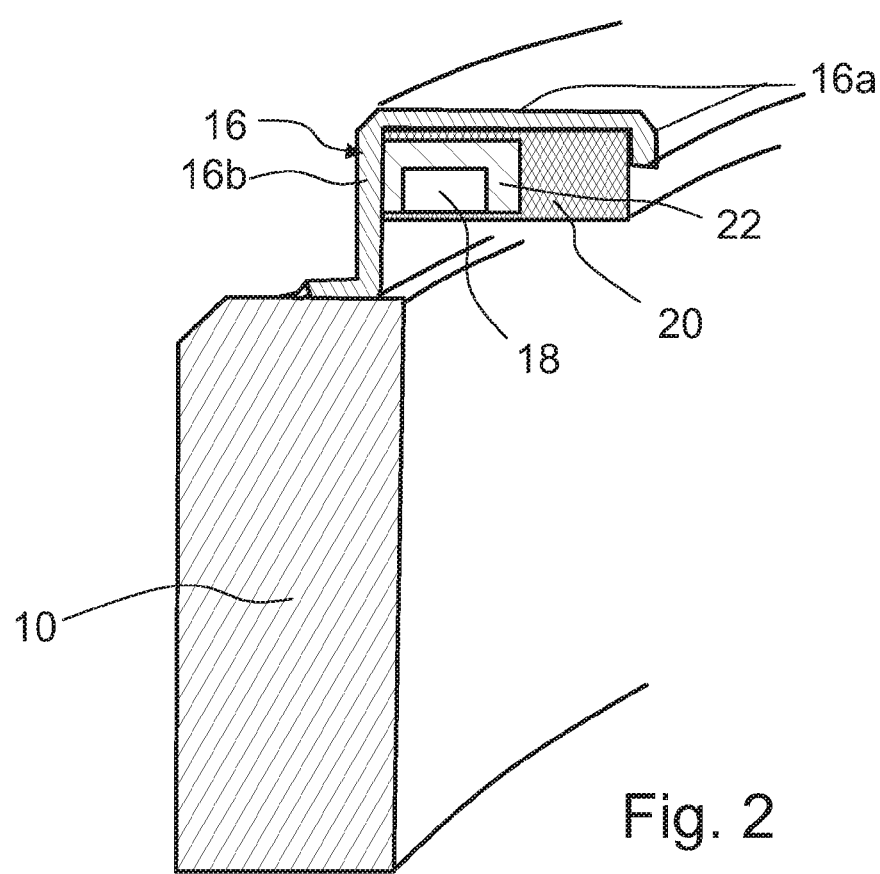
FIG. 2 is a sectional view of an outer ring of bearing with a cap attached according to a first embodiment of the invention.

FIG. 2 is a sectional view of the first ring 10 with the cap 16 attached. A vibration sensor 18 is attached on the inside surface of the cap 16. Further, a data processing unit for processing the sensor data and a wireless transmission unit or other kind of communication interface may be provided in an electronics package attached to the same inside surface of the cap 16 (not shown).

The cap 16 has a flange via which it is attached to the first ring 10 by brazing. This rigid connection leads to a good transmission of vibrations and reduces vibrations in eigenmodes of the cap. Clearances may be avoided and the stiffest connection possible can be made. Caps according to other embodiments of the invention do not include a flange.

In the embodiment of FIGS. 1 and 2, the cap 16 includes one axial end face 16a and one radial end face 16b, wherein the vibration sensor 18 is attached to the radial end face 16b. In further embodiments, the sensor 18 may be attached to the axial end face 16a or to both the radial end face 16b and the axial end face 16a. The vibration sensor 18 is mounted in a block 22 accommodated in an encapsulation 20 which will be described in further detail below. Both the connection between the vibration sensor 18 and the metal block 22 and between the metal block 22 and the cap 16 should be sufficiently stiff in order to ensure good signal transmission.

The following description of embodiments of the invention focuses on differences to the first embodiment, wherein the description of identical features is omitted for the sake of conciseness. The reader is referred to the above description of the first embodiment of the invention in this regard. Features with equivalent or similar functions are provided with the same reference numbers in order to highlight the similarities.

Figure 3:
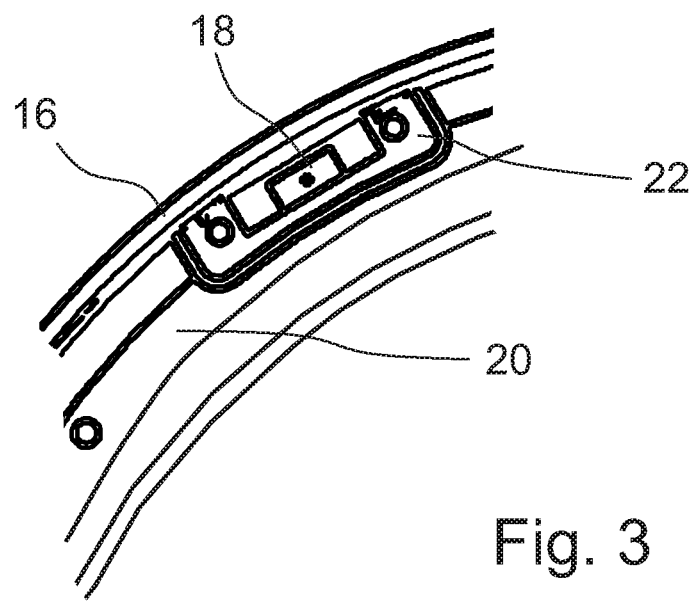
FIG. 3 is a view of a cap equipped with a vibration sensor according to the invention.

FIG. 3 shows a perspective view of the cap 16 equipped with the sensor 18 from the inside of the cap 16 facing the rolling chamber. The vibration sensor 18 is arranged in an encapsulation 20 within the cap. The encapsulation 20 is formed by injection molding or machining and attached to the cap 16 by screws. In other embodiments of the invention, the sensor 18 may be overmolded by a plastic material, preferably directly in the cap 16.

Figure 4:
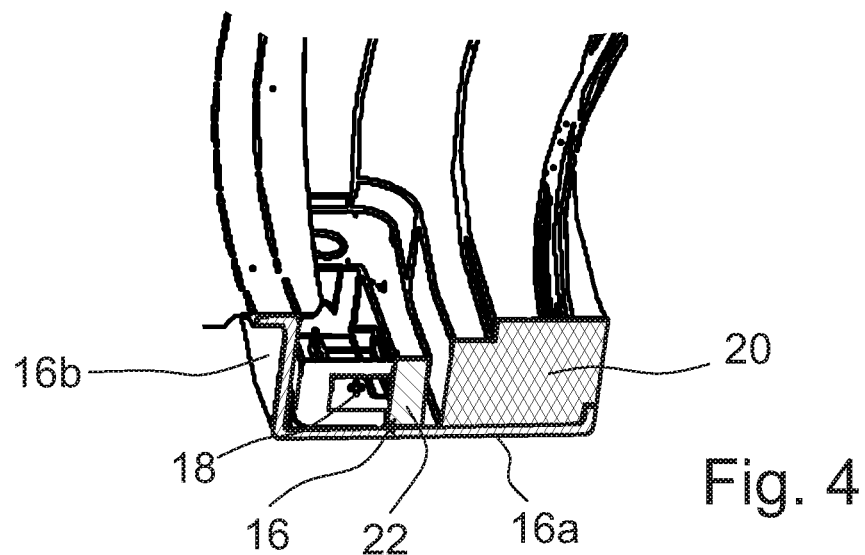
FIG. 4 is a sectional view of the cap according to FIG. 3.
Figure 5:
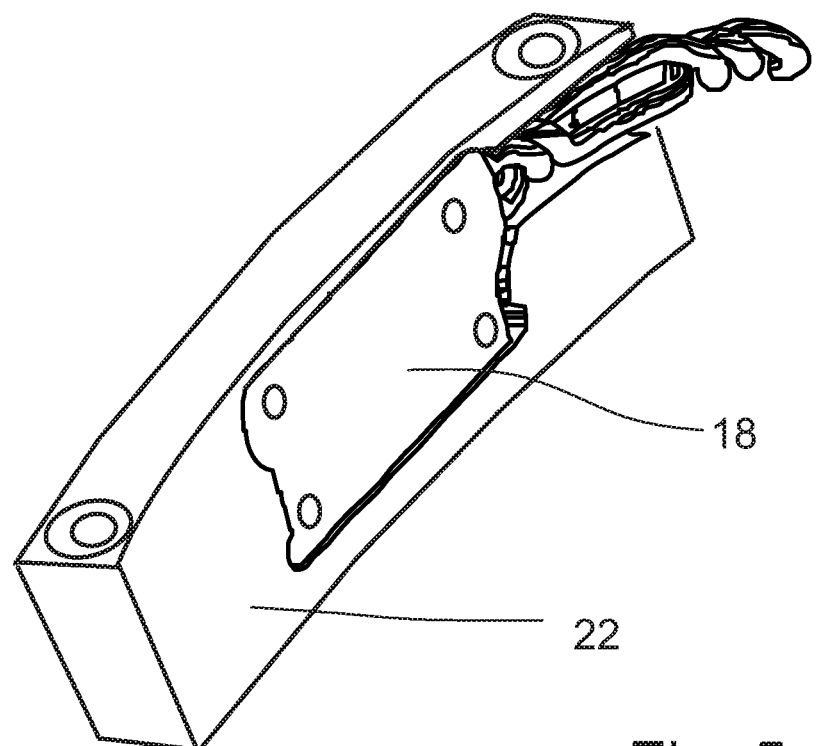
FIG. 5 is a metal bracket equipped with a vibration sensor detached from the cap.

FIG. 4 is a sectional view of the cap 16 provided with the sensor 18 in the block 22 with the encapsulation 20 and FIG. 5 shows the sensor 18 and the block detached from the cap 18 and the encapsulation 20.

The vibration sensor is mounted in an aluminum metal block 22 or bracket connected to the cap 18. The metal block 22 has a chamber to accommodate an air filled area which is kept free of the encapsulation material that is needed for the sensor 18 to function. In addition, the piezo is protected from outside effects such as lubricant, humidity and particles.

The invention claimed is:

1. A bearing comprising:
    a first ring,
    a second ring,
    at least one row of rolling elements arranged in a rolling chamber disposed between the first ring and the second ring and a cap attached to the first ring configured to close the rolling chamber, wherein
    at least one vibration sensor is attached on the inside of the cap, and
    wherein the vibration sensor is mounted in a metal block connected to the cap.

2. The bearing according to claim 1, wherein the cap is attached to the first ring by a material bonded connection.

3. The bearing according to claim 2, wherein the cap is attached to the first ring by brazing.

4. The bearing according to claim 1, wherein the cap includes at least one axial end face, and wherein the vibration sensor is attached to the axial end face.

5. The bearing according to claim 1, wherein the cap includes at least one radial end face and one axial end face, and wherein the vibration sensor is attached to the radial end face.

6. The bearing according to claim 1, wherein the cap is configured to damp vibrations within the cap.

7. The bearing according to claim 1, wherein the sensor is arranged in an encapsulation within the cap.

8. The bearing according to claim 7, wherein the encapsulation is formed by injection molding.

9. A machine assembly comprising:
    the bearing according claim 1,
    wherein
    the bearing is mounted such that the sensor is located in a loaded zone of the bearing.

10. The bearing according to claim 1,
    wherein the cap is metal, and
    wherein the metal block is mounted in a recess in an injection-molded encapsulation, and
    the injection-molded encapsulation is attached to the metal cap.

11. The bearing according to claim 10, wherein the cap includes an axial end face and a radial end face and wherein the encapsulation directly contacts the axial end face and directly contacts the radial end face.

12. The bearing according to claim 11, wherein the metal block directly contacts the radial end face.

13. The bearing according to claim 11, wherein the metal block includes an axially facing opening, and wherein the vibration sensor is located in the axially facing opening and wherein the encapsulation at least partially covers the axial facing opening.

14. The bearing according to claim 1, wherein the cap includes an axial end face and a radial end face and the metal block either a) directly contacts the axial end face and does not directly contact the radial end face or b) directly contacts the radial end face and does not directly contact the axial end face.

15. A bearing comprising:
a first ring,
a second ring,
at least one row of rolling elements arranged in a rolling chamber disposed between the first ring and the second ring and a cap attached to the first ring configured to close the rolling chamber, wherein
at least one vibration sensor is attached on the inside of the cap, and
wherein the cap is a stamped sheet metal part.

16. The bearing according to claim 15, wherein the vibration sensor is mounted in a metal block connected to the cap.

17. The bearing according to claim 1, further comprising a locking means for avoiding slippage of the first ring.

18. A cap used in a bearing, the bearing comprising:
a first ring,
a second ring,
at least one row of rolling elements arranged in a rolling chamber disposed between the first ring and the second ring and a cap attached to the first ring configured to close the rolling chamber, wherein
a vibration sensor is attached on the inside of the cap,
wherein the vibration sensor is mounted in a metal block connected to the cap, and
wherein the cap is a stamped sheet metal part.

19. The cap according to claim 18, wherein the metal block is mounted in a recess in an injection-molded encapsulation attached to the cap.

20. The cap according to claim 18, wherein the cap includes an axial end face and a radial end face and the metal block either a) directly contacts the axial end face and does not directly contact the radial end face or b) directly contacts the radial end face and does not directly contact the axial end face.

* * * * *